(12) United States Patent
Okada et al.

(10) Patent No.: US 6,844,029 B2
(45) Date of Patent: Jan. 18, 2005

(54) PHOTOCURABLE PRIMER COMPOSITION AND COATING METHOD BY USE OF THE SAME

(75) Inventors: Toshikazu Okada, Kanagawa-ken (JP); Shinji Tomita, Hyogo-ken (JP); Tsutomu Nagasao, Kanagawa-ken (JP); Hajime Sukejima, Tokyo (JP); Takao Matoba, Kanagawa-ken (JP)

(73) Assignee: Kansai Paint Co., Ltd.

( * ) Notice: Subject to any disclaimer, the term of this patent is extended or adjusted under 35 U.S.C. 154(b) by 144 days.

(21) Appl. No.: 10/207,877

(22) Filed: Jul. 31, 2002

(65) Prior Publication Data

US 2003/0109595 A1 Jun. 12, 2003

(30) Foreign Application Priority Data

Oct. 26, 2001 (JP) ........................................ 2001-328654
Nov. 14, 2001 (JP) ........................................ 2001-348797

(51) Int. Cl.[7] .............................. B05D 1/38; B05D 7/00; C08F 2/46; C08K 3/18
(52) U.S. Cl. .................... 427/492; 427/517; 427/407.1; 427/408; 427/409; 427/412.1; 427/419.1; 427/514; 522/81; 522/83; 522/74; 522/95; 522/96
(58) Field of Search ............................. 522/81, 83, 95, 522/96; 427/514, 517, 407.1, 408, 409, 412.1, 419.1, 492

(56) References Cited

U.S. PATENT DOCUMENTS

| | | | |
|---|---|---|---|
| 3,775,377 A | 11/1973 | Kokawa et al. | |
| 4,759,961 A | 7/1988 | Kato et al. | |
| 5,565,243 A | * 10/1996 | Mauer et al. | 427/407.2 |
| 5,847,021 A | 12/1998 | Tortorello et al. | |
| 5,852,067 A | 12/1998 | Sukejima et al. | |
| 6,107,361 A | 8/2000 | Tortorello et al. | |
| 6,312,765 B1 | * 11/2001 | Ueno | 427/510 |
| 6,342,588 B1 | * 1/2002 | Osbourn et al. | 530/413 |
| 6,617,413 B1 | * 9/2003 | Bruchmann et al. | 528/75 |

FOREIGN PATENT DOCUMENTS

| | | |
|---|---|---|
| DE | 2239411 | 2/1973 |
| EP | 0 983 801 A2 * | 3/2000 |
| WO | 97/16469 | 5/1997 |

* cited by examiner

Primary Examiner—Susan Berman
(74) Attorney, Agent, or Firm—Fisher, Christen & Sabol (57) ABSTRACT

A photocurable primer composition containing (A) an acrylic resin having through an urethane linkage a polymerizable unsaturated group on its side chain and containing the polymerizable unsaturated group in an amount of 0.2 to 2.0 mol/kg in a solid content of the resin (A), (B) an urethane (meth)acrylate oligomer containing at least one polymerizable unsaturated group in one molecule, and (E) a photopolymerization initiator, and a coating method.

18 Claims, 1 Drawing Sheet

Fig.1

PHOTOCURABLE PRIMER COMPOSITION AND COATING METHOD BY USE OF THE SAME

The application has priority benefit of Japanese Patent Application No. 01/328,654, filed on Oct. 26, 2001, and Japanese Patent Application No. 01/348,797, filed on Nov. 14, 2001.

BACKGROUND OF THE INVENTION (1) Field of the Invention

The present invention relates to a photocurable primer composition capable of being quickly cured by light irradiation, and showing good properties in workability, adhesion to a substrate, abrasion properties, etc., and to a coating method by use of the photocurable primer composition. The photocurable primer composition of the present invention may be used in coating an automobile body, a railway vehicle, an industrial equipment, woodworking, etc., and the coating method by use thereof makes it possible to provide good finish in a very short period of time, and is particularly useful as an automobile repair coating method.

(2) Description of the Background Art

A repair coating of an automobile body, etc. in the art mainly consists of the following successive steps of ① a step of thick applying a body filler to a damaged area, followed by drying and abrading a body filler-applied surface, ② a step of coating thereonto a primer surfacer in order to achieve topcoating finish properties, followed by drying and smoothly abrading the coating surface, and ③ a step of coating a topcoating, resulting in that the above coating, drying and abrading steps take a very long period of time. Recently, for the purpose of shortening a period of time taken for the repair coating as a whole, a repair coating by use of a photocurable putty composition has been proposed As examples of the above photocurable putty composition, a photocurable coating composition containing a polymerizable unsaturated group-containing resin and a photopolymerization initiator is disclosed in Japanese Patent Application Laid-Open Nos. 117588/79, 137089/97 (U.S. Pat. No. 5,852,067), 100306/97, etc. However, use of the above coating composition as a repair coating surfacer resulted problems of showing unsatisfactory coating film performances in abrasion properties, hardness, adhesion properties, water resistance, etc.

SUMMARY OF THE INVENTION

It is an object of the present invention to provide a photocurable primer composition capable of shortening a curing time and improving working efficiency and providing a coating composition having a long pot life.

It is another object of the present invention to provide a coating method by use of the photocurable primer composition, capable of greatly shortening a total time taken for respective steps without reducing coating film performances.

The present inventors made intensive studies for the purpose of solving the above problems in the art to find out that use of a coating composition having a specified composition containing a specified acrylic resin having through an urethane linkage a polymerizable unsaturated group as a primer surfacer may remarkably improve working efficiency without reducing coating film performances, resulting in accomplishing the present invention.

That is, the present invention provides a photocurable primer composition containing (A) an acrylic resin having through an urethane linkage a polymerizable unsaturated group on its side chain and containing the polymerizable unsaturated group in an amount of 0.2 to 2.0 mol/kg in a solid content of the resin (A), (B) an urethane (meth)acrylate oligomer containing at least one polymerizable unsaturated group in one molecule, and (E) a photopolymerization initiator, and a coating method by use thereof.

DETAILED DESCRIPTION OF THE INVENTION

The acrylic resin (A) in the present invention is an acrylic resin having through the urethane linkage the polymerizable unsaturated group on its side chain and containing the polymerizable unsaturated group in an amount of 0.2 to 2.0 mol/kg in the solid content of the resin (A).

The polymerizable unsaturated group may include, without particular limitations, any group capable of causing a radical polymerization reaction to take place by light such as visible light, near infrared rays, ultraviolet light and the like, and specifically may include (meth)acryloyl group, vinyl group, vinyl ether group, allyl group and the like. Of these, (meth)acryloyl group is particularly preferable. In the specification, "(meth)acryloyl group" means "acryloyl group or methacryloyl group".

An amount of the polymerizable unsaturated group is in the range of 0.2 to 2.0 mol/kg, preferably 0.3 to 1.5 mol/ky in the solid content of the resin (A). When an amount of the polymerizable unsaturated group is less than 0.2 mol/kg, an unsatisfactory crosslinking may reduce film properties. On the other hand, when more than 2.0 mol/kg, too much cure shrinkage may reduce adhesion properties.

Preferably, the polymerizable unsaturated group is introduced through the urethane linkage into the acrylic resin (A) by the application of a reaction between isocyanate group and hydroxyl group from a good adhesion properties of a coating film formed therefrom.

A preparation method of the acrylic resin (A) may include a method which comprises reacting (a) a hydroxyl group-containing acrylic resin and (b) a compound containing isocyanate group and polymerizable unsaturated group in one molecule, wherein the reaction may preferably be carried out under such conditions that hydroxyl group is used in an excess amount so that unreacted isocyanate group may not remain.

The hydroxyl group-containing acrylic resin (a) may preferably include a copolymer obtained by copolymerizing a polymerizable unsaturated monomer mixture containing a hydroxyl group-containing polymerizable unsaturated monomer in the presence of a polymerization initiator. Examples of the hydroxyl group-containing polymerizable unsaturated monomer may include hydroxyethyl (meth)acrylate, hydroxybutyl (meth)acrylate, an adduct of hydroxyethyl (meth)acrylate with lactone; Placcel FA2 and Placcel FM3 (trade names, marketed by Daicel Chemical Industries, Ltd. respectively), polyethylene glycol mono (meth)acrylate, 2-hydroxy-3-phenoxypropyl (meth)acrylate and the like. These may be used alone or in combination.

On preparing the hydroxyl group-containing acrylic resin (a), in addition to the hydroxyl group-containing polymerizable unsaturated monomer as the essential component, other polymerizable unsaturated monomer copolymerizable with the above monomer may optionally be used as a comonomer.

The other polymerizable unsaturated monomer may include ones copolymerizable with the hydroxyl group-containing polymerizable unsaturated monomer without particular limitations, and specifically may include monoesters of acrylic acid or methacrylic acid with monohydric alcohols having 1 to 24 carbon atoms such as methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, cyclohexyl (meth)acrylate, lauryl (meth)acrylate, isobornyl (meth)acrylate and the like; styrene, α-methylstyrene, acrylic acid, methacrylic acid, crotonic acid, itaconic acid, maleic acid, fumaric acid, 2-carboxyethyl (meth)acrylate, 2-carboxypropyl (meth)acrylate, 5-carboxypentyl (meth)acrylate, glycidyl (meth)acrylate, γ-(meth)acryloyloxy propyltrimethoxysilane, and the like. These may be used alone or in combination.

In the present invention, a reaction of the hydroxyl group contained in the hydroxyl group-containing acrylic resin (a) obtained as above with the isocyanate group contained in the compound (b) having isocyanate group and polymerizable unsaturated group in one molecule makes it possible to introduce through an urethane linkage a polymerizable unsaturated group onto a side chain of the acrylic resin (A).

The compound (b) having isocyanate group and polymerizable unsaturated group in one molecule may include, for example, an isocyanate group-containing polymerizable unsaturated monomer such as isocyanatoethyl (meth)acrylate, m-isopropenyl-α,α-dimethylbenzyl isocyanate and the like; a reaction product obtained by addition reaction of a compound having two isocyanate groups with a hydroxyl group-containing polymerizable unsaturated monomer at an equimolar ratio, and the like.

The compound containing two isocyanate groups may include, for example, aliphatic diisocyanate compound such as hexamethylene diisocyanate, trimethylenediisocyanate, 1,4-tetramethylene-diisocyanate, pentamethylenediisocyanate, 1,2-propylenediisocyanate, 1,2-butylenediisocyanate, trimethylhexamethylene diisocyanate, and the like; alicyclic diisocyanate compound such as isophoronediisocyanate, 4,4'-methylene bis (cyclohexylisocyanate), methylcyclobexane-2,4-(or -2,6-) diisocyanate, 1,3-cyclopentanediisocyanate, 1,2-cyclohexanediisocyanate and the like; aromatic diisocyanate compound such as xylylenediisocyanate, methaxylylene diisocyanate, tetramethylxylylenediisocyanate, tolylenediisocyanate, 4,4'-diphenylmethanediisocyanate, and the like.

The hydroxyl group-containing polymerizable unsaturated monomer may include ones exemplified in the above descriptions on the hydroxyl group-containing acrylic resin (a).

Secondly, a preparation method of the acrylic resin (A) containing through the urethane linkage the polymerizable unsaturated group on its side chain may include a method which comprises reacting an isocyanate group-containing acrylic resin (c) with a compound (c) containing hydroxyl group and polymerizable unsaturated group in one molecule.

The isocyanate group-containing acrylic resin (c) may preferably include a copolymer obtained by copolymerizing a polymerizable unsaturated monomer mixture containing the isocyanate group-containing polymerizable unsaturated monomer in the presence of a polymerization initiator. The isocyanate group-containing polymerizable unsaturated monomer may include, for example, isocyanatoethyl acrylate, m-isopropenyl-α,α-dimethylbenzylisocyanate, and the like. The compound (b) having isocyanate group and polymerizable unsaturated group in one molecule may also be used. These may be used alone or in combination.

The polymerizable unsaturated monomer other than the isocyanate group-containing polymerizable unsaturated monomer may preferably include a monomer copolymerizable with the isocyanate group-containing polymerizable unsaturated monomer and not having a functional group quickly reactive with isocyanate group, and specifically may include, for example, esters of acrylic acid or methacrylic acid with monohydric alcohols having 1 to 24 carbon atoms such as methyl (meth)acrylate, ethyl (meth)acrylate, propyl (meth)acrylate, n-butyl (meth)acrylate, isobutyl (meth) acrylate, pentyl (meth)acrylate, hexyl (meth)acrylate, 2-ethylhexyl (meth)acrylate, cyclohexyl (meth)acrylate, lauryl (meth)acrylate, isobornyl (meth)acrylate and the like; styrene, α-methylstyrene, and the like. These may be used alone or in combination.

The compound (d) having hydroxyl group and polymerizable unsaturated group in one molecule may include, for example, hydroxyethyl (meth)acrylate, hydroxybutyl (meth)acrylate, adduct of hydroxyethyl (meth)acrylate with lactone; hydroxyl group-containing polymerizable unsaturated monomer such as Placcel FA2 and Placcel FM3 (trade names, marketed by Daicel Chemical Industries, Ltd. respectively), polyethylene glycol mono (meth)acrylate, 2-hydroxy-3-phenoxypropyl (meth)acrylate and the like, a reaction product obtained by an addition reaction a compound having two hydroxyl groups with an isocyanate group-containing polymerizable unsaturated monomer at an equimolar ratio, and the like. These may be used alone or in combination.

The reaction between isocyanate group and hydroxyl group in the reaction of the component (a) with component (b) and the reaction of the component (c) with component (d) may preferably be carried out, if needed, by use of a solvent, an urethane-forming catalyst, a polymerization inhibitor, etc. at a reaction temperature in the range of 20 to 80° C. so that an urethane-forming reaction may be promoted and the polymerizable unsaturated group may not disappear.

In addition to the polymerizable unsaturated group, the acrylic resin (A) may contain a reactive functional group. In this case, a compound containing a reactive functional group reactable with a reactive functional group in the resin (A) may be added to the resin (A). A combination of the above reactive functional groups may include any combinations known in the art without particular limitations, for example, hydroxyl group and isocyanate group, epoxy group and amino group, epoxy group and carboxyl group, hydroxyl group and alkoxysilyl group, and the like. Specifically, in the case where the resin (A) contains hydroxyl group, a polyisocyanate compound may be added. The above compound may be added in an amount of 30% by weight based on a total resin solid content.

The acrylic resin (A) is such that before the polymerizable unsaturated group is introduced the acrylic resin (A) preferably has a weight average molecular weight in the range of 5,000 to 50,000, a glass transition temperature in the range of −50 to 100° C., preferably −50 to 70° C. The above weight average molecular weight less than 5,000 may reduce coating film properties. On the other hand, when more than 50,000, high viscosity may make handling difficult. When the glass transition temperature is lower than −50° C., a tack may remain after curing, and abrasion properties may be reduced. On the other hand, when higher than 100° C., adhesion properties may be reduced.

The above glass transition temperature is measured as follows. An exclusive aluminum pan having a diameter of 4.5 mm and a depth of 2 mm is charged with a resin solution having a solid content of 10 mg, followed by drying at 50° C. for 3 hours under vacuum and completely removing a solvent to obtain a solid content only as a measuring sample. The above measurement is carried out by use of SSC-5300 type Thermal Analysis Apparatus (trade name, marketed by Seiko Instruments Inc.) under such conditions that a heating rate is 20° C./min. and that a temperature increase is started at a temperature lower than a predetermined glass transition temperature by about 50° C.

The urethane (meth)acrylate oligomer (B) in the present invention is used for the purpose of improving adhesion properties and water resistance, and has a weight average molecular weight in the range of 400 to 3,000, preferably 400 to 2,000. When less than 400, too many unsaturated groups may increase cure shrinkage and may reduce adhesion properties. On the other hand, when more than 3,000, no remarkable effect on the improvement in adhesion properties may be obtained.

An amount of polymerizable unsaturated group in the urethane (meth)acrylate oligomer (B) is in the range of 1.0 to 2.5 mol/kg based on the solid content of the component (B). When less than 1.0 mol/kg, an unsatisfactory crosslinking may reduce coating film properties, adhesion properties and water resistance. On the other hand, when more than 2.5 mol/kg, too much cure shrinkage may reduce adhesion properties.

The urethane (meth)acrylate oligomer (B) may preferably be prepared by reacting a compound (e) containing at least two isocyanate groups in one molecule, a hydroxyl group-containing polymerizable unsaturated monomer (f) and a monohydric alcohol (g).

The compound (e) containing at least two isocyanate groups in one molecule may include, a diisocyanate compound, for example, aliphatic diisocyanate compound such as hexamethylene diisocyanate, trimethylenediisocyanate, 1,4-tetramethylene-diisocyanate, pentamethylenediisocyanate, 1,2-propylenediisocyanate, 1,2-butylenediisocyanate, trimethylhexamethylene diisocyanate, and the like; alicyclic diisocyanate compound such as isophoronediisocyanate, 4,4'-methylene bis (cyclohexylisocyanate), methylcyclohexane-2,4-(or -2,6-) diisocyanate, 1,3-cyclopentanediisocyanate, 1,2-cyclohexanediisocyanate and the like; aromatic diisocyanate compound such as xylylenediisocyanate, methaxylylene diisocyanate, tetramethylxylylenediisocyanate, tolylenediisocyanate, 4,4'-diphenylmethanediisocyanate, and the like; adducts thereof with polyhydric alcohol, low molecular weight polyester resin, water or the like; a cyclic polymer by ring polymerization of the above diisocyanate compounds; isocyanate.biuret type, and the like. Of these, a cyclic trimer of hexamethylene diisocyanate is preferable.

The hydroxyl group-containing polymerizable unsaturated monomer (f) is used for the purpose of introducing a polymerizable unsaturated group into the urethane (meth)acrylate oligomer (B), and may include, for example, hydroxyethyl (meth)acrylate, hydroxybutyl (meth)acrylate, an adduct of hydroxyethyl (meth)acrylate with lactone; Placcel FA2 and Placcel FA3 (trade names, marketed by Daicel Chemical Industries, Ltd. respectively), polyethylene glycol mono(meth)acrylate, 2-hydroxy-3-phenoxypropyl (meth)acrylate and the like.

The monohydric alcohol (g) is used for the purpose of blocking an excess amount of isocyanate group, and controlling a concentration of unsaturated group, in the synthesis of the urethane (meth)acrylate oligomer (B), and may include ones known in the art, for example, methyl alcohol, ethyl alcohol, n-propyl alcohol, isopropyl alcohol, n-butyl alcohol, i-butyl alcohol, 2-ethylbutanol, 2-ethylhexanol, benzyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, and the like.

The reaction of components (e), (f) and (g) may preferably be carried out, if needed, by use of a solvent, an urethane-forming catalyst, a polymerization inhibitor, etc. at a reaction temperature in the range of 20 to 80° C. so that an urethane-forming reaction may be promoted and the polymerizable unsaturated group may not disappear. In the case where the monohydric alcohol (g) is not used, isocyanate group and hydroxyl group may be used in an equivalent amount, or the reaction may be performed until the isocyanate group may disappear.

In addition to the above component (A) and (B), the photocurable primer composition of the present invention may optionally contain a polymerizable unsaturated compound (C) other than the resin (A) and the urethane (meth) acrylate oligomer (B). The other polymerizable unsaturated compound (C) is used as a reactive diluent and also used for the purpose of controlling an unsaturated group concentration in the coating composition, and preferably may include an ethylenically unsaturated group-containing monomer, or an oligomer other than the above component (B), more specifically, for example, (meth)acrylates of monohydric or polyhydric alcohol such as ethyl (meth)acrylate, butyl (meth)acrylate, 2-ethylhexyl (meth)acrylate, isobornyl (meth)acrylate, norbornyl (meth)acrylate, adamantyl (meth) acrylate, neopentyl glycol (meth)acrylate, hydroxyethyl (meth)acrylate, trimethylolpropane tri(meth)acrylate, tetramethylolmethane tetra(meth)acrylate, dipentaerythritol (meth)acrylate, tricyclodecanedimethanol di(meth)acrylate, 2,2-bis(4-(3-methacryloxy-2-hydroxypropoxy)-phenyl) propane, di(methacryloxyethyl)trimethylhexamethylene-diuretbane, 2,2-bis(4-methacryloxy-polyethoxyphenyl) propane and the like; 4-(meth)acryloyloxyl group-containing aromatic polycarboxylic acid and acid anhydride thereof such as 4-(meth)acryloyloxymethoxycarbonyl phthalic acid, 4-(meth)acryloyloxyethoxy-carbonyl phthalic acid and the like; aromatic vinyl compounds such as styrene, α-methylstyrene, chlorostyrene, vinyltoluene, t-butylstyrene, divinylbenzene and the like; diallyl phthalate, diallyl isophthalate, triallyl phthalate; epoxy acrylate, ethylene oxide-modified epoxyacrylate, polyester acrylate, polydimethylsilicone di(meth)acrylate, and the like. These may be used alone or in combination.

A mixing amount of the components (A), (B) and (C) is such that the component (A) is in the range of 5 to 95% by weight, preferably 10 to 90% by weight, the component (B) is in the range of 5 to 95% by weight, preferably 10 to 90% by weight, and the component (C) is in the range of 0 to 60% by weight, preferably 5 to 50% by weight based on a total solid content of the components (A), (B) and (C). When the acrylic resin (A) is less than 5% by weight, a residual tack may reduce abrasion properties. On the other hand, when more than 95% by weight, adhesion properties and water resistance may be reduced. A urethane (meth)acrylate oligomer (B) less than 5% by weight may reduce adhesion properties and water resistance. On the other hand, when more than 95% by weight, a residual tack may reduce abrasion properties. When the polymerizable unsaturated compound (C) is more than 60% by weight, a residual tack may reduce abrasion properties.

The photocurable primer composition of the present invention may preferably contain an extender pigment (D). The extender pigment (D) may be used for the purpose of a stress relaxation in a coating film and keeping adhesion properties, and may preferably include ones having a high optical transmission, for example, talc, mica, barium sulfate, kaolin, calcium carbonate, clay, silica, quartz, glass and the like. These may be used alone or in combination.

A mixing amount of the extender pigment (D) is in the range of 1 to 300 parts by weight, preferably 5 to 200 parts by weight per 100 parts by weight of a total resin solid content of the components (A), (B) and (C) in the primer composition. The above amount less than one part by weight may reduce abrasion properties, and development of an internal stress may reduce adhesion properties and water resistance. When more than 300 parts by weight, an increase of a viscosity of the coating composition may reduce workability.

The extender pigment (D) may optionally contain other fillers. The filler may include, for example, a color pigment such as titanium white, red oxide, carbon black, black iron oxide and the like, aluminum hydroxide, magnesium hydroxide, and the like.

The extender pigment (D) may optionally contain a resin particle from the standpoints of control of viscosity behavior, etc. The resin particle may include, for example, resin particles such as polymer beads as known in the art, ones obtained by finely grinding polymers of the above monomers, gelation polymer fine particles (see Japanese Patent Application Laid-Open Nos. 126287/76, 133233/78, 133236/78, 76447/81, 129065/83), and the like, particularly gelation polymer fine particles obtained by subjecting a monomer mixture containing divinyl monomer to emulsion polymerization in the presence of an allyl group-containing reactive emulsifier (for example, see Japanese Patent Application Laid-Open No. 66770/91) from the standpoint of having a satisfactory dispersibility to the components (A), (B) and (C).

The photopolymerization initiator (E) used in the photocurable primer composition of the present invention may include a photopolymerization initiator which is excited by a light energy on irradiation of light such as ultraviolet light, visible light, near infrared rays, and the like to generate a radical so that a radical polymerization may be initiated, for example, an acetophenone based compounds such as 4-phenoxydichloroacetophenone, 4-t-butyltrichloroacetophenone, 4-t-butyl-trichloroacetophenone, diethoxyacetophenone, 2-hydroxy-2-methyl-1-phenylpropane-1-on, 1-(4-isopropylphenyl)-2-hydroxy-2-methylpropane-1-on, 1-(4-dodecylphenyl)-2-hydroxy-2-methylpropane-1-on, 4-(2-hydroxyphenoxy)-phenyl(2-hydroxy-2-propyl)ketone, 1-hydroxycyclohexylphenylketone, 2-methyl-1-[4-(methylthio)phenyl]-2-morpholinopropanon-1 and the like; thioxanthone based compounds such as thioxanthone, 2-chlorothioxanthone, 2-methylthioxanthone, 2,4-dimethylthioxanthone, isopropylthioxanthone, 2,4-dichlorothioxanthone and the like; benzyl based compounds such as benzyl, benzyldimethylketal, benzyl-β-methoxyethylacetal, 1-hydroxycyclohexylphenylketone and the like; benzophenone based compounds such as benzophenone, methyl o-benzoylbenzoate, Michler's ketone, 4,4'-bisdiethylaminobenzophenone, 4,4'-dichlorobenzophenone and the like; benzoin ether based compounds such as benzoin, benzoin methyl ether, benzoin ethyl ether, benzoin isobutyl ether and the like; titanocene derivatives such as bis(cyclopentadienyl)-bis(2,6-difluoro-3-(1-pyl-1-il)phenyl) titanium and the like; camphor quinone, anthraquinone, 3-ketocoumarin, α-naphthyl, diphenylphosphine oxide, acylphosphine oxide, 2,4,6-trimethylbenzoyldiphenylphosphine oxide, bis(2,4,6-trimethylbenzoyl)-phenylphosphine oxide, 10-butyl-2-chloroacrydone, fluolenone and the like.

In addition to these, the photopolymerization initiator (E) may include known initiator systems, for example, an ionic dye—pair ionic compound system such as a cationic dye—borate anionic compound and the like (see, for example, Japanese Patent Application Laid-Open Nos. 60606/89 and 11607/90), a metal—allen compound—organic pigment system (see, for example, Japanese Patent Application Laid-Open Nos. 363308/92 and 17525/93), and the like, and may also include complexes of cationic pigments such as cyanine pigments, phthalocyanine pigments, pyrylium pigments, thiopyrylium pigments, azulenium pigments, metal complex pigments such as chrome pigments, nickel pigments and the like, naphthoquinone.anthraquinone pigments, indophenol pigments, indoaniline pigments, triphenylmethane pigments, triallylmethane pigments, nitroso compound and the like; specifically near infrared rays-absorbing cationic dye—borate anionic complex system (see Japanese Patent Application Laid-Open Nos. 143044/87, 11607/90, 111402/91, 194619/93, 77503/92), cyanine pigment-halogenated methyl group-containing triazine compound system and cyanine compound—metal allen compound system (see Japanese Patent Application Laid-Open No. 189548/90), metal alien compound—squalilium pigment system (see Japanese Patent Application Laid-Open No. 17525/93), cationic pigment—borate system (see Japanese Patent Application Laid-Open No. 4804/90), and the like.

The photopolymerization initiator (E) may be used in an amount of 0.01 to 20 parts by weight per 100 parts by weight of a total resin solid content of the components (A), (B) and (C) in the composition.

The photopolymerization initiator (E) may preferably be used in combination with an oxygen scavenger capable of absorbing oxygen during a free radical chain reaction and a chain transfer agent as an activated hydrogen doner. Examples of the oxygen scavenger may include phosphine, phosphite, phosphonate, stannous compounds, and other compounds easily oxidized by oxygen. Examples of the chain transfer agent may include, for example, tertiary amines such as triethylamine, N-methyldiphenylamine, isoamyl 4-dimethylaminobenzoate, triethanolamine, dimethylethanolamine and the like; dimethylaminoethyl methacrylate; N-phenylglycine, 2-mercaptobenzoxazole, 2-mercaptobenzothiazole, N,N-dialkylaniline such as 2,6-diisopropyl-N,N-dialkylaniline, N,N,2,4,6-pentamethylaniline and the like, and the like.

The photopolymerization initiator (E) may be used in combination with a boron based photosensitizer. The photosensitizer may include, for example, tetra-n-butyl-ammonium n-butyltriphenyl borate, tetramethylammonium n-butyltriphenyl borate, tetra n-butylphosphonium n-butyltriphenyl borate and the like.

The photopolymerization initiator (E) may also be used in combination with an organic peroxide. Examples of the organic peroxide may include benzoyl peroxide, methyl ethyl ketone peroxide, cyclohexanone peroxide and the like.

The primer composition of the present invention may also contain a phosphate group-containing compound from the standpoint of improving adhesion properties to the substrate. Examples of the phosphate group-containing compound may include acid phosphates such as dibutyl phosphate; 2-ethylhexyl phosphate and the like, acid phosphite, polyphosphoric acid compounds thereof, phosphoric acid copolymerized resin and the like. Further, the phosphoric acid copolymerized resin may be used as the resin (A), and the phosphate group-containing monomer may be used as the polymerizable unsaturated compound (C).

The phosphate group-containing compound may be used in an amount of 0.01 to 1.0 m mol/g, preferably 0.05 to 0.5 m mol/g as the phosphate group based on a total resin solid content of the components (A), (B) and (C) in the composition.

The primer composition of the present invention, if needed, may further contain cellulose derivatives, non-reactive diluents, thermoplastic resins and the like from the standpoints of improvements in adhesion properties to a substrate or a topcoating layer and in workability. The cellulose derivative may include cellulose acetate butyrate (CAB), nitrocellulose and the like, and further may include a graft copolymer of cellulose derivatives such as CAB with a monomer mixture of hydroxyl group-containing unsaturated monomer, other ethylenically unsaturated monomer and the like. The non-reactive diluent may include an organic solvent and the like. Examples of the thermoplastic resin may include polyethylene, polystyrene, polymethylmethacrylate, polyvinyl acetate, polyvinyl chloride, polycaprolactone and the like. Of these, particularly use of the cellulose derivative such as the CAB graft copolymer preferably results in an orientation of hydroxyl group on the coating film surface and in improvements in adhesion properties in the case where the topcoating is an urethane-curing one.

The above additional components may be used in such an amount as to have good compatibility with the components (A), (B) and (C), and preferably in the range of 40% by weight or less, preferably 1 to 20% by weight based on a total solid content of the components (A), (B) and (C).

The primer composition containing above components in the present invention desirably has a Ti value in the range of 5 or more, preferably 5 to 8 from the standpoint of storage stability. In the present specification, the Ti value is a numerical value of Ti (Thixotropy index) calculated as the ratio of an apparent viscosity obtained by using a rotary viscometer at a number of revolutions of 6 rpm and 60 rpm respectively, and is a target to indicate non-Newtonian property of flow of a coating composition for coating (see JIS K 5400 4.5.3 (1990)), that is, as Ti becomes larger, becomes the degree of thixotropy larger. A Ti value less than 5 may show poor storage stability.

Figure 1:
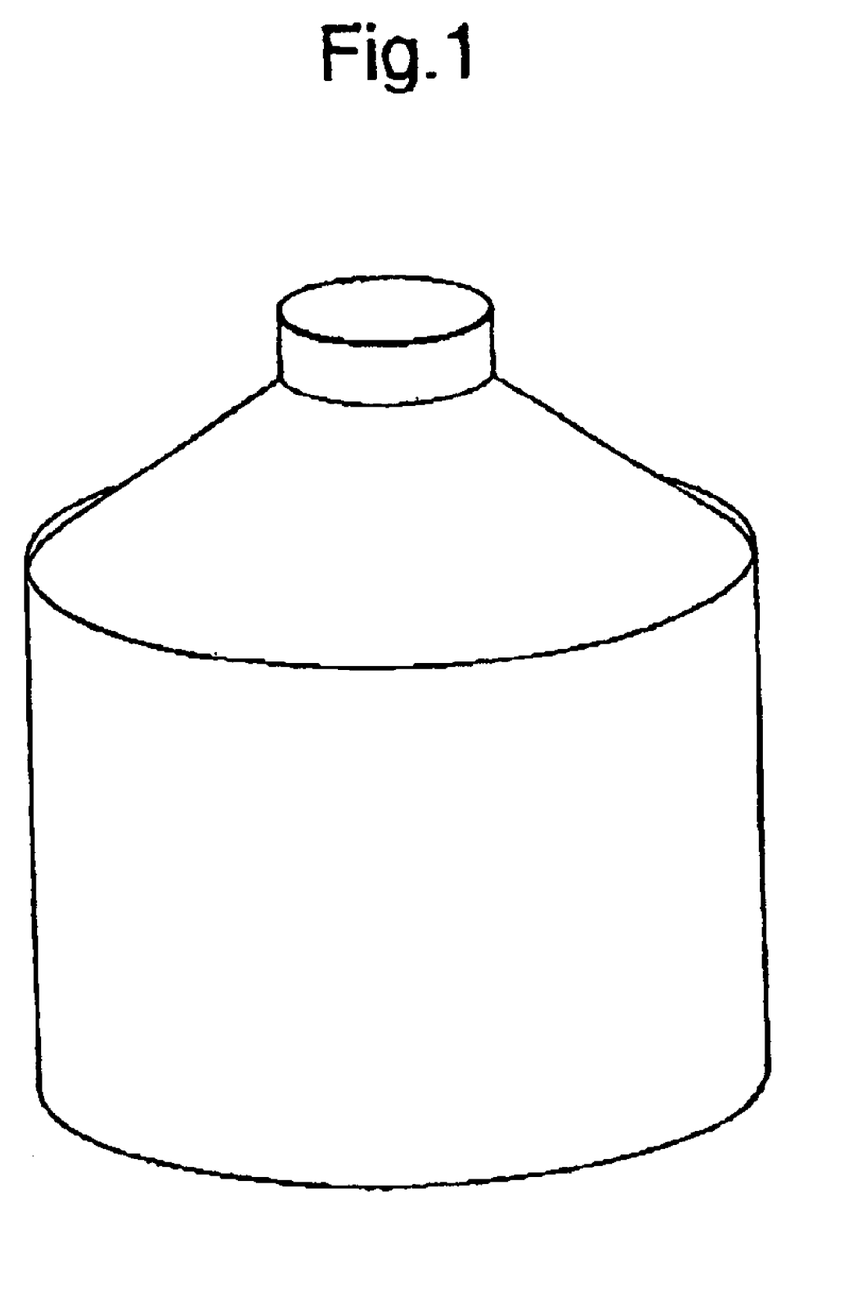
FIG. 1 is a schematic view of a container used for storing the photocurable primer composition of the present invention.

The above components of the primer composition in the present invention may be charged and stored in a usual round can or the like, but preferably may be charged in a container having a small top as shown in FIG. 1 so that light may be prevented from penetrating into an interior of the can on opening and closing the can. In the case where the can has the above shape as shown in FIG. 1, and the coating composition may settle at the bottom of the can like a soft cake depending on a concentration of the coating composition, the can may be shaken and stirred with a closed top prior to use, so that the coating composition may be restored to a uniform state.

The primer composition of the present invention is such that a propellant may be added to the above coating components, followed by charging the coating components along with the propellant into an aerosol container to form an aerosol coating composition. The propellant may include, for example, dimethyl ether, liquefied petroleum gas and the like as known in the art. These may be used alone or in combination.

The photocurable primer composition obtained as above in the present invention may be coated directly onto the surface of a substrate or putty-applied layer. The substrate may include, for example, metals such as iron, zinc, aluminum and the like, chemically treated metals, plastics, wood, ones having an old coating onto the above substrates, and the like. In repair coating, in the case where the substrate has a damaged area, sanding may suitably be carried out over an area including the damaged area and a surrounding area thereof. The putty-applied layer may be prepared by coating a putty such as a lacquer based, polyester based and epoxy based ones as known in the art onto the surface of the repair area, followed by drying and abrading.

The present invention also provides a coating method which comprises coating a photocurable putty composition onto the surface of the above substrate, followed by coating thereonto the photocurable primer composition of the present invention obtained as above.

The photocurable putty composition may include any ones known in the art without particular limitations, and containing a polymerizable unsaturated group-containing resin containing in one molecule at least one polymerizable unsaturated group to take place a radical polymerization reaction by a light such as visible light, near infrared rays, ultraviolet light and the like as exemplified in the photocurable primer composition, a polymerizable unsaturated compound, a photopolymerization initiator and a filler such as a pigment and the like, and may include, for example, photocurable putty compositions as disclosed in Japanese Patent Application Laid-Open Nos. 176517/97 and 302262/97.

The coating method of the photocurable putty composition may include, for example, a method which comprises adding the above polymerizable unsaturated compound to the photocurable putty composition so as to have a viscosity desirable for coating, followed by spray coating onto the damaged area, and a method which comprises applying the photocurable putty composition onto the damaged area by use of a spatula, depending on the conditions of the damaged area as a substrate.

The resulting putty coating film layer may be cured by light irradiation, or a photocurable primer composition may be coated onto the resulting putty coating film layer in an uncured state, followed by simultaneously curing both uncured coating film layers by light irradiation. From the standpoint of reducing coating steps, the latter coating method, which comprises coating both compositions by a wet-on-wet coating method and curing both coating film layers simultaneously by light irradiation, is preferable.

In the application of the wet-on-wet coating method, both coating film layers formed from the photocurable putty composition and the photocurable primer composition respectively are desired to easily transmit light, and particularly are such that the photocurable putty composition has a pigment volume concentration (hereinafter may be referred to as PVC) in the range of 10 to 30%, and the photocurable primer composition has a pigment volume concentration in the range of 10 to 40%. Both compositions preferably contain an extender pigment having a high transmission, and the photopolymerization initiator used in both compositions may preferably include a compound activated at a long wave length as in visible light or near infrared rays so that an interior of the coating film may also be cured.

Coating of the photocurable primer composition may be carried out by the conventional coating method such as a spray coating, roll coater coating, gravure coater coating, screen coating and the like. The spray coating may be carried out by controlling a coating viscosity. The primer coating film has a dry coating film thickness in the range of 30 to 500 $\mu$m, preferably 50 to 300 $\mu$m. The primer coating film cured by light irradiation may be abraded or not be abraded to be subjected to a topcoating step.

A light source used in light irradiation may include, without particular limitations, for example, halogen lamp, xenone lamp, krypton lamp, metal halide lamp, fluorescent tube, sunlight, semiconductor laser, light-emitting diode and the like. Irradiation conditions arbitrarily be selected depending on thickness and composition in the putty lay and primer layer respectively.

The topcoat coating method may include a one coat·one bake (or 1C1B) coating method by use of a colored coating composition, a coating method which comprises coating a colored base coating composition, followed by coating a clear composition, for example, two coats·one bake (or 2C1B) coating method, two coats·two bakes (or 2C2B) coating method, three coats·one bake (or 3C1B) coating method, three coats·two bakes (or 3C2B) coating method, three coats·three bakes (or 3C3B) coating method, and the like.

The colored base coating composition may include, without particular limitations, an organic solvent based coating composition, water based coating composition and the like as usually used in repair coating, for example, an acrylic lacquer, urethane-curing coating composition, fluorocarbon resin based coating composition and the like.

A colored base layer may usually be dried at normal temperature or force-dried by heating to form a dry coating film. In the present invention, for the purpose of reducing repair steps, coating of the colored base coating composition may preferably be followed by coating the following clear composition onto an uncured colored base coating file layer. In this case, the colored base coating composition may preferably include a one-pack type composition, particularly a composition mainly containing an active hydrogen group-containing resin and a color pigment.

The active hydrogen group contained in the above resin may include hydroxyl group, hydroxyphenyl group, amino group and the like. In the present invention, a hydroxyl group-containing resin is preferable from the standpoints of good curability and low coloring. Examples of the hydroxyl group-containing resin may include hydroxyl group-containing polyester resin, hydroxyl group-containing polyurethane resin, hydroxyl group-containing polyether resin, and the like.

The color pigment may include glitters such as aluminum paste, pearl powder, graphite, Micaceous Iron Oxide and the like, titanium white, phthalocyanine blue, carbon black and the like, optionally may contain an extender pigment.

The colored base coating composition may optionally contain a phosphate group-containing resin, additives used in the coating composition, for example, ultraviolet light absorber, light stabilizer, antioxidant, surface controlling agent, pigment dispersant, curing catalyst and the like, and the like.

The clear composition may include, without particular limitations, one-pack or two-pack coating composition usually used in repair coating, for example, acrylic lacquer, urethane-curing coating composition, fluorocarbon resin based coating composition and the like, preferably one pack type composition, particularly the compositions (1) to (3):

(1) a one-pack clear composition containing (h) a resin containing at least one functional group selected from siloxy group and isocyanate group, (i) a compound containing at least one group selected from siloxy group and isocyanate group, and reactive with a functional group contained in the resin (h), and (j) a siloxy group-dissociating catalyst;

(2) a one-pack clear composition containing (h) a resin containing at least one functional group selected from siloxy group and isocyanate group, (i) a compound containing at least one group selected from siloxy group and isocyanate group, and reactive with a functional group contained in the resin (h), (j) a siloxy group-dissociating catalyst, (k) a polymerizable unsaturated group-containing compound, and (l) a photopolymerization initiator; and (3) a one-pack coating composition containing (m) a resin having a polymerizable unsaturated group and containing at least one functional group selected from siloxy group and isocyanate group, (n) a compound containing at least one functional group selected from siloxy group and isocyanate group and reactive with a functional group reactive with a functional group contained in the resin (m), (j) a siloxy group-dissociating catalyst, and (l) a photopolymerization initiator.

The resin (h) containing at least one functional group selected from siloxy group and isocyanate group may be obtained by copolymerizing a vinyl monomer having siloxy group and/or isocyanate group and other vinyl monomer copolymerizable therewith in the presence of a radical polymerization initiator according to the conventional polymerization method such as a solution polymerization, specifically by copolymerizing a monomer mixture containing siloxy group-containing vinyl monomer and/or isocyanate group-containing vinyl monomer.

The siloxy group-containing vinyl monomer may typically include, for example, trialkylsiloxyalkyl (meth) acrylates such as trimethylsiloxyethyl (meth)acrylate, trimethylsiloxypropyl (meth)acrylate, trimethylsiloxybutyl (meth)acrylate, triethylsiloxyethyl (meth)acrylate, triethylsiloxypropyl (meth)acrylate, triethylsiloxybutyl (meth) acrylate and the like; and may also include compounds obtained by converting hydroxyl group An a hydroxyl group-containing vinyl monomer into siloxy group by use of a conventional silylating agent, for example, compounds obtained by converting hydroxyl group in an addition product of $\epsilon$-caprolactone with hydroxyethyl methacrylate and polyoxyalkylene glycol (meth)acrylates into siloxy group by use of a silylating agent such as trimethylchlorosilane, t-butyldimethylchlorosilane and the like respectively.

The isocyanate group-containing vinyl monomer may typically include, for example, isocyanatoethyl (meth) acrylate, isocyanatopropyl (meta-isopropenyl-$\alpha,\alpha$-dimethylbenzylisocyanate and the like, and may also include addition products of a hydroxyl group-containing vinyl monomer such as hydroxyethyl (meth)acrylate and the like with a polyfunctional isocyanate compound such as isophorone diisocyanate and the like.

The other vinyl monomer copolymerizable with the reactive functional group-having vinyl monomer may typically include, for example, vinyl aromatic compounds such as styrene α-methylstyrene, vinyltoluene and the like; $C_{1-24}$ alkyl ester or cycloalkyl ester such as methyl (meth)acrylate, ethyl (meth)acrylate, n-propyl (meth)acrylate, isopropyl (meth)acrylate, (n-, i-, t-)butyl (meth)acrylate, hexyl (meth) acrylate, 2-ethylhexyl (meth)acrylate, n-octyl (meth) acrylate, decyl (meth)acrylate, lauryl (meth)acrylate, stearyl (meth)acrylate, cyclohexyl (meth)acrylate, isobornyl (meth) acrylate, and the like; $C_{2-18}$ alkoxyalkyl ester of acrylic acid or methacrylic acid such as methoxybutyl (meth)acrylate, methoxyethyl (meth)acrylate, ethoxybutyl (meth)acrylate and the like; carboxyl group-containing polymerizable unsaturated monomer such as (meth)acrylic acid, crotonic acid, itaconic acid, maleic acid, fumaric acid, 2-carboxyethyl (meth)acrylate and the like; epoxy group-containing polymerizable unsaturated monomer such as glycidyl (meth)acrylate and the like; perfluoroalkyl (meth) acrylate such as perfluorobutylethyl (meth)acrylate, perfluoroisononylethyl (meth)acrylate, perfluorooctylethyl (meth) acrylate and the like; fluoroolefin represented by the general formula: $CX_2=CX_2$, wherein X is same or different and represents H, Cl, Br, F, alkyl group or haloalkyl group, provided at least one F is contained in the formula, such as $CF_2=CF_2$, $CHF=CF_2$, $CH_2=CF_2$, $CClF=CF_2$ and the like; ultraviolet light-absorbable or ultraviolet light-stable polymerizable unsaturated monomer such as 2-(2'-hydroxy-5'-methacryloyloxyethylphenyl)-2H-benzotriazole, 4-(meth)acryloyloxy-1,2,2,6,6-pentamethylpiperidine and the like; and so-called macromonomer, as a monomer copolymerizable with a vinyl monomer having a reactive functional group, which is a polymer of one and/or more of the above monomers and has a copolymerizable double bond at one terminal. These monomers may arbitrarily be selected depending on predetermined properties.

The solvent used in the solution polymerization of the above monomer mixture may include, for example, alkylbenzene derivatives such as benzene, toluene, xylene and the like; an acetate solvent such as ethyl acetate, propyl acetate, amyl acetate, methoxybutyl acetate, cellosolve acetate and the like; an ether solvent such as dioxane, ethylene glycol diethyl ether, ethylene glycol dibutyl ether, diethylene glycol diethyl ether and the like; a ketone solvent such as methylisobutylketone and the like. These may be used alone or in combination, The radical polymerization initiator may include, for example, peroxides such as benzoyl peroxide, di-t-butylhydroperoxide, t-butylhydroperoxide, cumylperoxide, cumenehydroperoxide, diisopropylbenzenehydroperoxide, t-butylperoxybenzoate, laurylperoxide, acetylperoxide, t-butylperoxy-2-ethylhexanoate and the like; azo compounds such as α,α'-azobisisobutylonitrile, α,α'-azobis-2-methylbutylonitrile, azobisdimethylvaleronitrile, azobiscyclohexanecarbonitrile and the like.

The resin (h) may further contain alkoxysilyl group from the standpoints of improvements in curing properties and acid resistance. The alkoxysilyl group may be introduced by addition of an alkoxysilyl group-containing vinyl monomer to the above monomers.

The alkoxysilyl group-containing vinyl monomer may typically include, for example, vinyltrimethoxysilane, vinyltriethoxysilane, γ-(meth) acryloyloxypropyltrimethoxysilane, γ-(meth) acryloyloxypropyldimethoxymethylsilane, γ-(meth) acryloyloxypropyltriethoxysilane, styrylethyltrimethoxysilane, vinyltris(2-methoxyethoxy) silane, vinyltriacetoxysilane, and the like.

The resin (h) obtained by the conventional radical solution polymerization by use of the vinyl monomer, the solvent and the polymerization initiator has preferably a weight average molecular weight in the range of 1,000 to 200,000, preferably 2,000 to 100,000. A weight average molecular weight less than 1,000 may make difficult to obtain a satisfactory drying properties, and may result a coating film showing poor properties in weather resistance and durability. On the other hand, when more than 200,000, a finish appearance may be reduced.

On the other hand, the resin (m) having a polymerizable unsaturated group, and containing at least one functional group selected from siloxy group and isocyanate group preferably has at least one, preferably about 2 to 50 of polymerizable unsaturated group in one molecule, and about 2 to about 100, preferably about 2 to about 50 on an average of at least one group selected from siloxy group and isocyanate group in one molecule, and may be obtained by introducing polymerizable unsaturated group into a copolymer obtained by copolymerizing a monomer mixture containing an arbitrarily selected functional group-having vinyl monomer and other vinyl monomer copolymerizable therewith, more specifically a monomer mixture containing either one or both of the siloxy group-containing vinyl monomer and the isocyanate group-containing vinyl monomer in the presence of a radical polymerization initiator according to the conventional polymerization method such as solution polymerization method.

The polymerizable unsaturated group may include, without particular limitations, ones, which takes place a radical polymerization reaction by a light having a wave length at 300 nm, specifically (meth)acryloyl group, vinyl group, vinyl ether group, allyl group and the like. Of these, (meth) acryloyl group is particularly preferable.

A method of introducing the polymerizable unsaturated group may include methods known in the art without particular limitations, for example, a method which comprises introducing carboxyl group into the comonomer components of the copolymer by use of a carboxyl group-containing polymerizable unsaturated monomer, followed by addition of glycidyl (meth)acrylate thereto, a method which comprises introducing epoxy group into the comonomer components of the copolymer by use of an epoxy group-containing polymerizable unsaturated monomer, followed by addition of (meth)acrylic acid thereto, a method which comprises subjecting an isocyanate group-containing copolymer to an addition reaction with 2-hydroxyethyl (meth)acrylate and the like, a method which comprises subjecting a siloxy group (or hydroxyl group)-containing copolymer to an addition reaction with an equimolar addition product of 2-hydroxyethyl (meth)acrylate and the like with a diisocyanate compound, and the like. Of these, the resin obtained by the method which comprises subjecting the siloxy group (or hydroxyl group)-containing copolymer to the addition reaction with the equimolar addition product of 2-hydroxyethyl (meth)acrylate and the like with the diisocyanate compound, is preferable from the standpoints of weather resistance and coating film properties.

The compound (i) or (n) containing at least functional group selected from siloxy group and isocyanate group and reactive with a functional group contained in the resin (h) or (m) may be a low molecular compound or a resin, and is an isocyanate group-containing compound or an isocyanate group and siloxy group-containing resin in the case where the resin (h) has siloxy group, and is a siloxy group-containing compound or a siloxy group and isocyanate group-containing resin in the case where the resin (h) has isocyanate group respectively. The compound (i) or (n) may be the same as the resin (h) or (m) in the case where the resin (h) or (m) has both siloxy group and isocyanate group respectively.

The following descriptions of the component (i) may be duplicated by the descriptions of the component (n) in the same manner as above.

The isocyanate group-containing compound used as the compound (i) may include polyisocyanate containing at least two isocyanate groups in one molecule, and may typically include organic diisocyanates, for example, aliphatic diisocyanates such as tetramethylene diisocyanate, hexamethylene diisocyanate, trimethylhexamethylene diisocyanate and the like; cycloaliphatic diisocyanates such as hydrogenated xylylene diisocyanate, 1,4-diisocyanatocyclohexane, isophorone diisocyanate and the like; aromatic diisocyanates such as tolylene diisocyanate, 4,4'-diphenylmethane diisocyanate and the like; and the like, and may also include adducts of these organic diisocyanates with polyhydric alcohol, low molecular weight polyester, water or the like; cyclization polymers between respective organic diisocyanates, isocyanate.biuret adducts, and the like. Further, the compound (i) may include a resin obtained by copolymerizing an isocyanate group-containing vinyl monomer with styrene, (meth)acrylates and the like.

From the standpoints of mar resistance and solubility to a solvent, the above polyisocyanate may include an adduct of diisocyanate with a long chain polyhydric alcohol, for example, polyisocyanate compounds prepared by reacting the above diisocyanate with a polyol such as $C_{10-30}$ alkylenediol, polycaprolactone polyol, polyether polyol, polyester polyol and the like. Of these, polyisocyanate compounds prepared by reacting a diisocyanate compound with polycaprolactone diol and/or triol are preferable.

The siloxy group-containing compound used in component (i) may include a compound having at least two siloxy groups in one molecule, specifically a compound obtained by converting hydroxyl group in a compound having at least two hydroxyl groups in one molecule into siloxy group by use of a conventionally used silylating agent, and typically include, for example, compounds obtained by converting hydroxyl group in dihydric alcohols such as ethylene glycol, propylene glycol, 1,2-butanediol, 1,3-butanediol, 2,3-butanediol and the like; polylactone diols prepared by addition of lactones such as ϵ-caprolactone and the like to the dihydric alcohols; trihydric or higher alcohols such as glycerin, trimethylolpropane, pentaerythritol and the like; polylactone polyols prepared by addition of lactones such as ϵ-caprolactone and the like to the trihydric or higher alcohols, and the like into siloxy group by use of a silylating agent such as trimethylchlorosilane, t-butyldimethylchlorosilane and the like. Further, the component (i) may include a resin obtained by copolymerizing the siloxy group-containing vinyl monomer as exemplified in the description of the resin (h) with other vinyl monomer such as styrene, (meth)acrylates and the like.

The siloxy group and, isocyanate group-containing resin used as the component (i) may include a resin obtained by copolymerizing the siloxy group-containing vinyl monomer, the isocyanate group-containing vinyl monomer and other vinyl monomer copolymerizable therewith as exemplified in the description of the resin (h) according to the conventional method.

The component (i) may further contain alkoxysilyl group from the standpoints of improvements in curing properties and acid resistance. The alkoxysilyl group may be introduced by use of the alkoxysilyl group-containing vinyl monomer as exemplified in the description of the resin (h) as a comonomer in addition to the above comonomers.

In the present invention, from a practical point of view, particularly a resin containing at least two siloxy groups in one molecule is selected as the component (h), and a polyisocyanate compound is selected as the component (i).

A siloxy group content in the components (h) and (i) is preferably in the range of 5 to 60% by weight, preferably 10 to 50% by weight as solid content based on the amount of a composition consisting of the siloxy group-containing vinyl monomer and compound in both components. When less than 5% by weight, a low crosslinking density of the coating film may result poor coating film properties. On the other hand, when more than 60% by weight, no further improvements in performances are expected.

The hydroxyl group in the components (h) and (i) is hydrolized after coating with moisture in air to form hydroxyl group. Therefore, an amount of a composition consisting of the isocyanate group-containing vinyl monomer and compound may be such that an equivalent ratio of isocyanate group to hydroxyl group formed from siloxy group is preferably in the range of NCO/OH=0.5 to 2.0.

The siloxy group-dissociating catalyst (j) is used to promote formation of hydroxyl group due to hydrolysis of siloxy group by moisture in air after coating, and may include acidic compounds, for example, phosphoric acid, acid ester thereof, phosphate; sulfonic acid such as paratoluene sulfonic acid, naphthalene disulfonic acid and the like; amine salt thereof; carboxylic acid such as trichloroacetic acid, trifluoroacetic acid and the like, amine salt thereof, and the like.

The siloxy group-dissociating agent (j) may preferably be used in an amount of 0.01 to 10% by weight, preferably 0.1 to 5% by weight based on a solid content of a resin composition in the coating composition. When less than 0.01% by weight, curing properties may be reduced. When more than 10% by weight, water resistance of the coating film may be reduced.

The polymerizable unsaturated group-containing compound (k) may include, without particular limitations, ones known in the art, specifically ones exemplified in the descriptions of the component (C) in the photocurable primer composition.

The polymerizable unsaturated group-containing compound (k) may preferably be used in an amount of 5 to 90 parts by weight, preferably 5 to 80 parts by weight per 100 parts by weight of a total resin solid content in the coating composition. When less than 5 parts by weight, quick drying properties due to photocuring of the resulting coating film may become unsatisfactory. When more than 90 parts by weight, an increase in volume shrinkage of the coating film may reduce adhesion properties and coating film properties.

The photopolymerization initiator (l) may include, without particular limitations, ones known in the art, specifically ones exemplified in the description of the component (E) in the photocurable primer composition.

The photopolymerization initiator (l) may preferably be used in an amount of 0.01 to 10% by weight based on a solid content of a resin composition in the coating composition.

The one pack clear composition may optionally contain a curing catalyst such as an urethane-forming catalyst and the like, water-bonding agent, cellulose derivatives, non-reactive diluents, thermoplastic resins, anti-blocking agents, organic solvents, ultraviolet light absorbers, photostabilizers, film surface controlling agents, antioxidants, flow controlling agents and the like The one pack clear composition of the present invention is such that a propellant may be added to the above coating components, followed by charging the coating components along with the propellant into an aerosol container to form an aerosol coating composition. The propellant may include, for example, dimethyl ether, liquefied petroleum gas and the like as known in the art. These may be used alone or in combination.

Coating of the colored base coating composition may be carried out by the conventional coating method such as a spray coating, roll coater coating, gravure coater coating, screen coating and the like. The spray coating may be carried out by controlling a coating viscosity. The resulting colored base coating film has a dry coating film thickness in the range of 5 to 100 µm, preferably 5 to 50 µm. In the present invention, from the standpoints of reduction of steps and improvements in adhesion properties, coating of the colored base coating composition may preferably be followed by coating the clear composition onto an uncured colored base coating film layer, but optionally the uncured colored base coating film may be dried or force-dried by heating.

Coating of the clear composition may be carried out by the conventional coating method such as a spray coating, roll coater coating, gravure coater coating, screen coating and the like. The spray coating may be carried out by controlling a coating viscosity.

The resulting clear coating film may be cured by heating or light irradiation depending on its composition, specifically may be dried by heating in the case where the clear composition is the one pack clear composition (1), or may be cured by light irradiation in the case where the clear composition is the one pack clear composition (2) or (3) along with the colored base coating film when uncured respectively. The clear coating film has a dry film thickness in the range of 10 to 200 µm preferably 30 to 100 µm.

The heat-drying may be carried out by heating usually at 50 to 100° C. for 10 to 60 minutes. The light irradiation may be carried out so that the light source used in the light irradiation may be selected from ones exemplified as above, and that the irradiation conditions may arbitrarily be selected depending on a film thickness or composition of the clear coating film or colored base coating film.

The use of the photocurable primer composition of the present invention is characterized in that the use of one pack composition can shorten the curing time and improve working efficiency, that since no curing takes place prior to light irradiation, the coating composition has a long usable life. The use of a specified polymerizable unsaturated group-containing resin results a primer coating film containing a large amount of urethane linkages and showing improved properties in adhesion properties to the substrate and abrasion properties, and finish properties after coating a topcoating. The use of the composition of the present invention makes possible a wet-on-wet coating between a putty-applied layer and a primer coating film layer, and makes it possible to shorten a step time, and results a resulting coating film showing improved properties in curing properties and adhesion properties between layers.

EXAMPLE

The present invention is explained more in detail by the following Examples, wherein "part" and "%" represent "part by weight" and "% by weight" respectively.

Preparation of Acrylic Resin

Preparation Example 1

A reactor equipped with a thermometer, thermostat, stirrer, reflux condenser, dropping pump, and dry air-introducing pipe was charged with 50 parts of xylene, followed by heating up to 115° C. with agitation, dropping a mixture of the monomer and polymerization initiator as shown in Table 1 at a constant speed over 3 hours at 115° C. by use of a dropping pump, keeping at 110° C. for 1.5 hours after the completion of the dropping procedure, dropping a solution prepared by dissolving 0.5 part of an additional polymerization initiator into 10 parts of xylene over 1.5 hours at a constant speed, keeping at 110° C. for 3 hours with agitation, cooling down to 80° C. while adding 25 parts of xylene for diluting, adding 0.06 part of hydroquinone monomethyl ether as a polymerization inhibitor, 0.06 part of dibutyltindilaurate as an urethane-forming catalyst, 18.2 parts of an equimolar adduct of isophorone diisocyanate and hydroxyethyl acrylate, and 14 parts of xylene while introducing a dry air into a liquid phase, keeping at 80° C. for 7 hours to complete an addition reaction so as to obtain an acrylic resin solution (A1). The resin solution (A1) was a uniform transparent solution having a non-volatile matter of 55% and a Gardner viscosity of Z6. The above resin had a weight average molecular weight of 17,000 and a glass transition temperature of 60° C. prior to introducing a polymerizable unsaturated group.

Preparation Examples 2–6

Preparation Example 1 was duplicated except formulations as shown in Table 1 were used respectively to obtain acrylic resin solutions (A2) to (A6), properties of which are also shown in Table 1 in the same manner as in Preparation Example 1.

Preparation Example 7

A glycidyl group-containing acrylic resin in the same manner as in Preparation Example 1 except that a formulation of the monomer and polymerization initiator was used as shown in Table 1, followed by adding 0.06 part of hydroquinone monomethyl ether as a polymerization initiator, 1.0 part of tetrabutylammonium bromide as an esterifying catalyst, 4.6 parts of acrylic acid and 14 parts of xylene while introducing a dry air into a liquid phase at 110° C., keeping at 110° C. for 7 hours to complete an addition reaction so as to obtain an acrylic resin solution (A7) having a radically polymerizable unsaturated group on its side chain without through an urethane linkage. Respective properties of the resin solution are shown in Table 1 in the same manner as in Preparation Example 1.

TABLE 1

| | | | Preparation Examples | | | | | | |
|---|---|---|---|---|---|---|---|---|---|
| | | | 1 | 2 | 3 | 4 | 5 | 6 | 7 |
| Acrylic resin solutions | | | A1 | A2 | A3 | A4 | A5 | A6 | A7 |
| Formulation | monomers | styrene | 10.0 | 10.0 | 10.0 | | 20.0 | 10.0 | 20 |
| | | methyl methacrylate | 10.0 | 10.0 | 10.0 | 15.0 | 20.0 | 10.0 | |
| | | n-butyl methacrylate | 5.0 | 5.0 | 5.0 | 34.5 | 47.0 | 5.0 | 10.5 |
| | | i-butyl methacrylate | 60.0 | 60.0 | 60.0 | 30.0 | | 60.0 | 60 |
| | | hydroxyethyl methacrylate | 14.0 | 14.0 | 14.0 | 20.5 | | 14.0 | |
| | | isocyanatoethyl methacrylate | | | | | 13.0 | | |
| | | methacrylic acid | 1.0 | 1.0 | 1.0 | | | 1.0 | |
| | | glycidyl methacrylate | | | | | | | 9.5 |
| | polymerization initiator | azobisisobutylonitrile | 2.3 | 2.3 | | | 1.5 | 2.3 | 2.3 |
| | | azobis-2-methylbutylonitrile | | | 10.0 | 4.8 | | | |
| | unsaturated group-introducing component | equimolar adduct of isophorone diisocyanate with hydroxyethyl acrylate | 18.2 | | 18.2 | 27.3 | | 5.0 | |
| | | isocyanatoethyl methacrylate | | 16.6 | | | | | |
| | | hydroxyethyl acrylate | | | | | 9.7 | | |
| | | acrylic acid | | | | | | | 4.6 |
| Properties | glass transition temperature (° C.) | | 60.0 | 63.0 | 56.0 | 48.0 | 55.0 | 60.0 | 52.0 |
| | non-volatile matter (%) | | 55.0 | 54.5 | 55.5 | 56.8 | 53.0 | 52.0 | 52.0 |
| | Gardner viscosity | | Z6 | Z7 | W | Z | Z7 | Z | Z2 |
| | weight average molecular weight | | 17,000 | 16,000 | 6,000 | 9,000 | 20,000 | 16,000 | 16,000 |
| | unsaturated group content (mol/kg) | | 0.45 | 0.92 | 0.45 | 0.63 | 0.76 | 0.12 | 0.61 |

Preparation of Urethane Acrylate Oligomer

Preparation Example 8

A reactor equipped with a thermometer, thermostat, stirrer, reflux condenser, dropping pump and dry air-introducing pipe was charged with 583.5 part of N-3300 (Trade name, marketed by Sumika Bayel Urethane Co., Ltd., solid content 100%, cyclic trimer of hexamethylene diisocyanate, NCO content 21.5%), 26 parts of xylene, 0.47 part of hydroquinone monomethyl ether as a polymerization inhibitor, and 0.47 part of dibutyltin dilaurate as an urethane-forming catalyst, followed by heating up to 80° C. while introducing a dry air into a liquid phase with agitation, dropping a mixture of 288.3 parts of hydroxybutyl acrylate and 66.7 parts of n-butanol at 80° C. over 3 hours at a constant speed by use of a dropping pump, keeping at 80° C. for 5 hours to complete an addition reaction, cooling while adding 216 parts of isopropanol for diluting to obtain an urethane (meth)acrylate oligomer solution (B1). The oligomer solution (B1) was a uniform transparent solution having a non-volatile matter of 80% and a Gardner viscosity of W. Unsaturated group content: 2.12 mol/kg, weight average molecular weight: 940.

Preparation Examples 9 and 10

Preparation Example 8 was duplicated except that respective formulations of an isocyanate compound, hydroxyl group-containing polymerizable unsaturated monomer and monohydric alcohol as shown in Table 2 were used to obtain oligomer solutions (B2) and (B3). Properties of the oligomers (B2) and (B3) are also shown in Table 2.

TABLE 2

| | Preparation Examples | | |
|---|---|---|---|
| | 8 | 9 | 10 |
| Urethane acrylate oligomer Formulation | B1 | B2 | B3 |
| isocyanate compound | | | |
| N-3300 | 583.5 | 583.5 | |
| isophorone diisocyanate | | | 222.3 |
| hydroxy group-containing polymerizable unsaturated monomer | | | |
| hydroxyethyl acrylate | | 116.1 | |
| hydroxybutyl acrylate | 288.3 | | 273.9 |
| alcohol | | | |
| ethanol | | 87.5 | |
| n-butanol | 66.7 | | |
| Properties | | | |
| non-volatile matter | 80.0 | 77.0 | 68.0 |
| Gardner viscosity | W | V | T |
| unsaturated group content (mol/kg) | 2.12 | 1.26 | 1.99 |
| weight average molecular weight | 940 | 790 | 500 |

Preparation of Primer Composition

Example 1

A reactor was charged with 90.9 parts of the acrylic resin solution (A1), 50 parts of urethane acrylate oligomer solution (B1), 10 parts of isobornyl acrylate, 50 parts of Microace L-1 (Note 1), 150 parts of Barium sulfate (Note 2), and 50 parts of xylene, followed by mixing and stirring, charging glass beads having a diameter of 1.5 mm, dispersing for 20 minutes with a batch sand mill, charging 5 parts of Kayamer PM-21 (Note 3) and 4 parts of photopolymerization initiator Irgacure 819 (Note 4), stirring to obtain a primer composition (PI) having a Ti value of 5.5.

(Note 1): Microace L-1: talc, marketed by Nippon Talc Co., Ltd., trade name. (Note 2): Settling barium sulfate 100, trade name, marketed by Sakai Chemical Industry Co, Ltd.

(Note 3); Kayamer PM-21, trade name, marketed by Nippon Kayaku Co., Ltd., unsaturated group-containing phosphate monomer.

(Note 4): Irgacure 819, trade name, marketed by Ciba Specialty Chemicals K.K., bis(2,4,6-trimethylbenzoyl)-phenylphosphine oxide.

(Note 5) Resin fine particle G:

One liter-flask equipped with a stirring apparatus, thermometer, cooling tube, heating mantle was charged with 3547.5 parts of deionized water and 40 parts of Latemul S-120A (trade name, marketed by Kao Corporation, sulfosuccinic acid based acrylic group-containing anionic reactive emulsifier, 50% aqueous solution), heating up to 90° C. with agitation, adding thereinto 20% of an aqueous solution prepared by dissolving 12.5 parts of VA-086 (trade name, marketed by Wako Pure Chemicals Industries, Ltd., water-soluble azoamide polymerization initiator) into 500 parts of deionized water, 15 minutes after adding 5% of a monomer mixture of 300 parts of styrene, 400 parts of methyl methacrylate, 200 parts of n-butyl acrylate and 100 parts of 1,6-hexanediol diacrylate, stirring for 30 minutes, dropping the remaining monomer mixture and the aqueous polymerization initiator solution over 3 hours and 3.5 hours respectively at 90° C., after the completion of dropping the aqueous polymerization initiator solution keeping at 90° C. for 30 minutes, cooling down to a room temperature, separating by use of a filter cloth to obtain an aqueous gelatinized fine particle polymer water dispersion having a solid content of 20% and a particle size of 72 nm, and drying in a stainless pat to obtain a resin fine particle (G).

Examples 2–11 and Comparative Examples 1–5

Example 1 was duplicated except that formulations shown in Table 3 were used to obtain primer compositions P2 to P16 respectively. In Comparative Example 5, a composition free of the pigment was prepared.

Respective primer compositions were subjected to a measurement of a Ti value, followed by storing in the container shown in FIG. 1 at 20° C. for 3 months to evaluate conditions of the coating solution respectively as follows. ○; nothing abnormal; Δ: some thickening, but neither settlement nor agglomeration of the pigment; x: the pigment settled and agglomerated in the form of a hard cake.

TABLE 3

|  |  | Examples |  |  |  |  |  |  |  |  |  |  | Comparative Examples |  |  |  |  |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 |
| Primer compositions |  | P1 | P2 | P3 | P4 | P5 | P6 | P7 | P8 | P9 | P10 | P11 | P12 | P13 | P14 | P15 | P16 |
| Unsaturated | A1 | 90.9 |  | 90.9 |  |  |  |  |  |  | 90.9 | 90.9 |  |  | 90.9 |  |  |
| acrylic resin | A2 |  | 91.7 |  |  |  |  |  |  |  |  |  |  |  |  |  |  |
| solutions | A3 |  |  |  | 144.1 |  |  |  |  |  |  |  |  |  |  |  |  |
|  | A4 |  |  |  |  | 123.2 |  |  |  |  |  |  |  |  |  |  |  |
|  | A5 |  |  |  |  |  | 56.6 | 18.9 | 56.6 | 18.9 |  |  |  |  |  |  | 56.6 |
|  | A6 |  |  |  |  |  |  |  |  |  |  |  | 96.2 |  |  |  |  |
|  | A7 |  |  |  |  |  |  |  |  |  |  |  |  | 96.2 |  |  |  |
| Urethane acrylate | B1 | 50 |  |  | 12.5 | 25 |  | 12.5 |  | 12.5 | 50 | 50 | 50 | 50 |  | 62.5 |  |
| oligomer solution | B2 |  | 51.9 |  |  |  | 51.9 |  | 51.9 |  |  |  |  |  |  |  | 51.9 |
|  | B3 |  |  | 58.8 |  |  |  |  |  |  |  |  |  |  |  |  |  |
| Isobornyl acrylate |  | 10 | 10 | 10 | 10 | 10 | 30 | 80 | 30 | 80 | 10 | 10 | 10 | 10 | 50 | 50 | 30 |
| Kayamer PM21 |  | 5 | 5 | 5 | 5 | 5 | 5 | 5 | 5 | 5 | 5 | 5 | 5 | 5 | 5 | 5 | 5 |
| Irgacure 819 |  | 4 | 4 | 4 | 4 | 4 | 4 | 4 | 4 | 4 | 4 | 4 | 4 | 4 | 4 | 4 | 4 |
| Microace L-1 |  | 50 | 50 | 50 | 50 | 50 | 50 | 50 | 50 | 50 | 50 | 50 | 50 | 50 | 50 | 50 | 0 |
| Settling barium sulfate 100 |  | 150 | 150 | 150 | 150 | 150 | 150 | 150 | 150 | 150 | 50 | 50 | 150 | 150 | 150 | 150 | 0 |
| Resin fine particle G |  |  |  |  |  |  |  |  | 5 | 10 |  | 10 |  |  |  |  |  |
| Xylene |  | 50 | 50 | 50 | 50 | 50 | 50 | 50 | 50 | 50 | 50 | 50 | 50 | 50 | 50 | 50 | 50 |
| Ti value |  | 5.5 | 5.6 | 5.2 | 5 | 5.3 | 2.8 | 2.5 | 5.4 | 5.1 | 2.5 | 5.3 | 5 | 2 | 3 | 1.5 | 1.1 |
| Storage stability |  | ○ | ○ | ○ | ○ | ○ | Δ | Δ | ○ | ○ | Δ | ○ | ○ | X | Δ | X | ○ |

Coating

Examples 12–22 and Comparative Examples 6–10

Respective primer compositions of Examples and Comparative Examples as shown in Table 3 were mixed with xylene so that a resulting viscosity may be controlled at 20 seconds (Ford cup #4/20° C.), followed by spray coating onto a mild steel sheet (90×150×0.8 mm) so as to a dry film thickness of 100 to 150 μm, irradiating at an irradiation distance of 15 cm for 10 minutes by use of a halogen lamp for curing, slightly abrading the surface of the primer coating layer with a #600 water-resistant abrasive paper, spray coating Retan PG-80 white (trade name, acrylic utethane resin based topcoating composition, marketed by Kansai Paint Co., Ltd.) so as to be a dry film thickness of 50 μm. and drying at 60° C. for 30 minutes to obtain respective coating test panels. The results of performance tests are shown in Table 4. The test methods are as follows.

(*1) Tackiness: Tackiness on the surface of respective coating test panels was examined and evaluated as follows. ○: good; Δ: some tack on the surface; x: considerable tack on the surface.

(*2) Adhesion Properties: Cross cut-cellophane tape adhesion test was carried out, and evaluated as follows. ○: Nothing separated; Δ: partly separated; x: wholly separated (*3) Sanding Properties: The surface of the primer coating film layer was abraded by a #600 water resistant sanding paper to examine abraded conditions and evaluated as follows. ○: good; Δ: some sanding difficulty; x: considerable sanding difficulty.

(*4) Finish Properties: Finish properties of respective coating test panels were visually evaluated as follows ○: good; Δ: some sink mark observed on the surface; x: considerable sink mark observed on the surface.

(*5) Water Resistance: Respective topcoated test panels were dipped into a tap water for 7 days, followed by examining conditions (development of blister) of the coating surface, and by carrying out a cross cut-cellophane tape adhesion test. Evaluations were made respectively as follows. Conditions of coating surface: ○: good; Δ: blister partly developed; x: blister wholly developed. Cross cut-cellophane tape adhesion properties: ○: Nothing separated; Δ: partly separated; x: wholly separated.

TABLE 4

| | Examples | | | | | | | | | | | Comparative Examples | | | | |
|---|---|---|---|---|---|---|---|---|---|---|---|---|---|---|---|---|
| | 12 | 13 | 14 | 15 | 16 | 17 | 18 | 19 | 20 | 21 | 22 | 6 | 7 | 8 | 9 | 10 |
| Primer compositions | P1 | P2 | P3 | P4 | P5 | P6 | P7 | P8 | P9 | P10 | P11 | P12 | P13 | P14 | P15 | P16 |
| Tackiness (*1) | ○ | ○ | ○ | ○ | ○ | ○ | Δ | ○ | Δ | ○ | ○ | Δ | ○ | Δ | Δ | X |
| Adhesion properties (*2) | ○ | ○ | ○ | ○ | ○ | ○ | ○ | ○ | ○ | ○ | ○ | Δ | Δ | X | ○ | ○ |
| Abrasion properties (*3) | ○ | ○ | ○ | ○ | ○ | Δ | Δ | Δ | Δ | ○ | ○ | Δ | ○ | Δ | X | X |
| Finish properties (*4) | ○ | ○ | ○ | ○ | ○ | ○ | ○ | ○ | ○ | ○ | ○ | ○ | ○ | ○ | ○ | ○ |
| Water resistance (*5) | | | | | | | | | | | | | | | | |
| Conditions of coating surface | ○ | ○ | ○ | ○ | ○ | ○ | ○ | ○ | ○ | ○ | ○ | Δ | Δ | Δ | ○ | X |
| Adhesion properties | ○ | ○ | ○ | Δ | Δ | ○ | Δ | ○ | Δ | ○ | ○ | X | X | X | ○ | X |

Preparation of Photo Putty Composition

Preparation Examples 11–12

According to the formulations shown in Table 5, respective components were successively added, mixed and dispersed with agitation to obtain respective photocurable putty compositions PT1 and PT2.

(Note 5) SP-1507: trade name, marketed by Showa Highpolymer Co., Ltd., acrylate group-containing epoxy resin.

(Note 6) SP-5003: trade name, marketed by Showa Highpolymer Co., Ltd., acrylate group-containing epoxy resin.

(Note 7) N,N,2,4,6-pentamethylaniline, chain transfer agent.

TABLE 5

| | Preparation Examples | |
|---|---|---|
| | 11 | 12 |
| Putty composition | PT1 | PT2 |
| SP-1507 (Note 6) | 100 | |
| SP-5003 (Note 7) | | 100 |
| Styrene | 15 | |
| Isobornyl acrylate | | 10 |
| Cellulose acetate butylate | 5 | 5 |
| Titanium white | 10 | |
| Talc | 100 | 50 |

TABLE 5-continued

| | Preparation Examples | |
|---|---|---|
| | 11 | 12 |
| Camphorquinone | 2 | 1 |
| N,N,2,4,6-pentamethylaniline (Note 8) | 1 | 1 |
| PVC (%) | 27 | 15 |

Coating

Example 23

The putty composition (PT1) obtained in Preparation Example 11 was coated onto a mild steel sheet (90×150×0.8 mm) to be a thickness of 5 mm by use of a spatula, followed by irradiating at an irradiation distance of 20 cm for 2 minutes by use of Square Light (trade name, marketed by Ushio Lighting, Inc., metal halide lamp), slightly abrading the resulting putty-applied surface, spray coating the primer composition (P1) obtained as above to be a dry film thickness of 50 to 100 μm, irradiating at an irradiation distance of 20 cm for 2 minutes by use of Square Light as above for curing, slightly abrading the resulting primer layer surface by use of a #600 water resistant abrasive paper, and spray coating Retan PG-80 White (trade name, marketed by Kansai Paint Co., Ltd., acrylic urethane resin based topcoating composition) to be a dry film thickness of 50 μm, and drying at 60° C. for 30 minutes to obtain a coating test panel.

Example 24

The putty composition (PT2) obtained in the above Preparation Example was coated onto a mild steel sheet (90×150× 0.8 mm) to be a thickness of 5 mm by use of a spatula to form a coating layer, followed by spray coating the primer composition (P11) obtained in the Preparation Example to be a dry film thickness of 50 to 100 μm onto the coating layer surface to form a coating layer, irradiating at an irradiation distance of 20 cm for 2 minutes by use of Square Light (trade name, marketed by Ushio Lighting Inc., metal halide lamp) to cure both coating layers, spray coating, without abrading the primer surface, Retan PG-80 White (trade name, acrylic urethane resin based topcoating composition, marketed by Kansai Paint Co., Ltd.) to be a dry film thickness of 50 μm, and drying at 60° C. for 30 minutes to obtain a coating test panel.

Comparative Example 11

LUC putty cocuring agent (trade name, marketed by Kansai Paint Co., Ltd., organic peroxide based compound) was mixed with LUC Poly Putty (trade name, marketed by Kansai Paint Co., Ltd., unsaturated polyester resin based low temperature-curing two pack putty base material) in an amount of 2% relative to LUC poly putty just before use to obtain a putty composition, followed by coating the putty composition by use of a spatula so as to be a thickness of 5 mm, drying at 20° C. so that abrasion can be carried out to obtain a putty coating layer. Next, JUST Urethane Primer-Surfacer curing agent (trade name, marketed by Kansai Paint Co., Ltd.) was mixed in an amount of 20%, and Retan PG2K Thinner (trade name, marketed by Kansai Paint Co., Ltd.) was mixed in an amount of 20% relative to JUST Urethane Primer-Surfacer (trade name, marketed by Kansai Paint Co., Ltd., acrylic urethane resin based two pack primer surfacer base material) with JUST Urethane Primer-Surfacer (as above) respectively to obtain a primer composition. The primer composition was spray coated onto the putty coating layer so as to be a dry film thickness of 50 to 100 μm, followed by force-drying at 60° C. so that abrasion can be carried out, slightly abrading the resulting primer surface by use of a #600 water-resistant abrasive paper, and spray coating Retan PG-80 White (trade name, acrylic urethane resin based topcoating composition, marketed by Kansai Paint Co., Ltd.) so as to be a dry film thickness of 50 μm, and drying at 60° C. for 30 minutes to obtain a coating test panel.

The performance test results of respective coating test panels are shown in Table 6. Test methods are as follows. Adhesion properties are as explained in (*2).

(*6) Total drying time: A total time of photoirradiation time and heating time in the steps of forming the putty coating layer and primer coating layer.

(*7) Finish Properties: In the preparation of respective coating test panels, coating of a topcoating composition was followed by lamp irradiation or force-drying, and leaving to stand at 20° C. for 24 hours to visually examine the coating surface. Evaluation was made as follows. ○: good; Δ; some distortion on the surface; x: considerable distortion on the surface.

(*8) Water Resistance: Respective coating test panels were dipped into a tap water for 7 days, followed by examining conditions (development of blister) of the coating surface, and by carrying out the same adhesion properties test as above and a bending test. The bending test was carried out by bending respective coating panels on a central part by an angle of 90°, and by visually examining the conditions of the bent part. Evaluations were made as follows respectively.

Conditions of the coating film; ○: good; Δ: blister partly developed; x: blister wholly developed. Adhesion properties: ○: Nothing peeled; Δ: partly peeled; x: wholly peeled. Bending test: ○: good; Δ: slightly peeled; x: peeled.

TABLE 6

|  | Examples | | Comparative Example |
|---|---|---|---|
|  | 23 | 24 | 11 |
| Putty composition | PT1 | PT2 | LUC Poly Putty |
| Primer composition | P1 | P11 | JUST Urethane Primer-Surfacer |
| Total drying time | 4 minutes | 2 minutes | 50 minutes |

TABLE 6-continued

|  | Examples | | Comparative Example |
|---|---|---|---|
|  | 23 | 24 | 11 |
| Adhesion properties (*2) | ○ | ○ | ○ |
| Finish properties (*7) | ○ | ○ | ○ |
| Water resistance (*8) | | | |
| Conditions of the coating surface | ○ | ○ | ○ |
| Adhesion properties (*2) | ○ | ○ | ○ |
| Bending test | ○ | ○ | ○ |

Preparation of Colored Base Coating Composition

Retan PG hybrid full shade No. 835 (trade name, marketed by Kansai Paint Co., Ltd., colored base coating composition containing hydroxyl group-containing acrylic resin as a main resin component) was mixed with PG hybrid thinner 20 (marketed by Kansal Paint Co., Ltd, trade name) so that the viscosity may be controlled at 11 to 12 seconds (Ford cup #4/25° C.) to obtain a one pack colored base coating composition.

Preparation of Acrylic Resin for Clear Composition

A reactor equipped with a thermometer, thermostat, stirrer, reflux condenser, dropping pump and dry air-introducing pipe was charged with 50 parts of xylene, followed by heating up to 115° C. with agitation, dropping a mixture of monomers and polymerization initiator as shown in Table 7 at 115° C. over 3 hours at a constant speed by use of a dropping pump, after the completion of dropping keeping at 110° C. for 1.5 hours, dropping a solution prepared by dissolving 0.5 part of azobisisobutylonitrile into 10 parts or xylene at a constant speed over 1.5 hours, keeping at 110° C. for 3 hours with agitation to complete the polymerization reaction, adding 25 parts of xylene and cooling down to 80° C. while diluting to obtain an acrylic resin solution (C1) for one pack clear composition.

Separately, the above procedures were followed by adding, while introducing a dry air into the liquid phase, 0.06 part of hydroquinone monomethyl ether as a polymerization inhibitor, 0.06 part of dibutyltindilaurate as an urethane-forming catalyst, the equimolar adduct of isophorone diisocyanate with hydroxyethyl acrylate as shown in Table 7 and 14 parts of xylene, and keeping at 80° C. for 7 hours to carry out the addition reaction and to obtain an acrylic resin solution (C2) for clear composition.

TABLE 7

|  | Preparation Examples | |
|---|---|---|
| Acrylic resin solutions for clear composition | C1 | C2 |
| Formulation | | |
| styrene | 30 | 10.0 |
| methyl methacrylate | | 10.0 |
| n-butyl methacrylate | 35 | 5.0 |
| 2-ethylhexyl methacrylate | 5 | |
| trimethylsiloxyethyl methacrylate | 30 | 11.0 |
| i-butyl methacrylate | | 56.0 |
| hydroxyethyl methacrylate | | 7.0 |

TABLE 7-continued

| Acrylic resin solutions for clear composition | Preparation Examples | |
|---|---|---|
| | C1 | C2 |
| methacrylic acid | | 1.0 |
| azobisisobutylonitrile | 3.5 | 2.3 |
| azobisisobutylonitrile | 0.5 | 0.5 |
| equimolar adduct of isophorone diisocyanate with hydroxyethyl acrylate | | 18.2 |
| Properties | | |
| non-volatile matter (%) | 60 | 55.0 |
| Gardner viscosity | LM | Z6 |
| weight average molecular weight | 14,000 | 17,000 |
| hydroxyl value after dissociation (mg KOH/g) | 83 | 30 |

Preparation of Clear Composition

A mixture of the acrylic resin solution for clear composition, polyisocyanate compound (Note 9), diisopropyl phosphate (siloxy group-dissociating catalyst), dibutyltindilaurate (urethane-forming catalyst), trimethyl orthoacetate (water-bonding agent), urethane acrylate (Note 10), isobornyl acrylate and photopolymerization initiator (Note 11) as shown in Table 8 was stirred with a disper, followed by adding PG hybrid thinner 20 (trade name, marketed by Kansai Paint Co., Ltd.) so as to control the viscosity at 13 to 14 seconds (Ford cup #4/25° C.) to obtain one pack clear coating compositions (CR1) to (CR3). Separately, PG multi clear HX (Q) (trade name, marketed by Kansai Paint Co., Ltd., acrylic urethane resin based two pack clear composition) was used as a two pack clear composition. A usable time and a drying time including photoirradiation time of the above compositions are shown in Table 9.

(Note 9) TFA-100: trade name, marketed by Asahi Kasei Corporation, hexamethylene diisocyanate based polyisocyanate.

(Note 10) CN983: marketed by Sartmer Company, trade name, urethane acrylate oligomer.

(Note 11) IRGACURE-184: marketed by Ciba Specialty Chemicals K.K., 1-hydroxycyclohexyl-phenylketone.

TABLE 8

| Clear composition | Preparation Examples | | |
|---|---|---|---|
| | CR1 | CR2 | CR3 |
| Composition | | | |
| resin solution (C1) for clear composition | 134 | 134 | |
| resin solution (C2) for clear composition | | | 163 |
| CN983 (Note 10) | | 10 | |
| isobornyl acrylate | | 5 | |
| diisopropylphosphate | 1 | 1 | 1 |
| trimethyl-orthoacetate | 1.5 | 1.5 | 1.5 |
| IRGACURE-184 (Note 11) | | 4 | 4 |
| dibutyltindilaurate | 0.05 | 0.05 | 0.05 |
| TPA-100 (Note 9) | 17.7 | 17.7 | 14.2 |
| NCO/OH ratio | 1.0 | 1.0 | 1.0 |

TABLE 9

| Clear composition | CR1 | CR2 | CR3 | PG multi clear HX(Q) |
|---|---|---|---|---|
| Usable time | >6 months | >6 months | >6 months | 2 hours |
| Drying time | 60° C. 20 minutes | 10 minutes or less | 10 minutes or less | 60° C. 20 minutes |

Coating

Example 25

The putty composition (PT1) obtained in the above Preparation Example was coated onto a mild steel sheet (90×150× 0.8 mm) to be a thickness of 5 mm by use of a spatula, followed by irradiating at an irradiation distance of 20 cm for 2 minutes by use of Square Light (trade name, marketed by Ushio Lighting, Inc., metal halide lamp), slightly abrading the putty coating surface, spray coating the primer composition (P1) obtained in Example 1 to be a dry film thickness of 50 to 100 μm, irradiating at an irradiation distance of 20 cm for 2 minutes by use of Square Light (trade name as above) for curing, slightly abrading the primer coating surface with a #600 water-resistant abrasive paper, spray coating the viscosity-controlled one pack colored base coating composition to be a dry film thickness of 15 μm, leaving to stand at room temperature (about 20° C.) for 5 minutes, spray coating the clear composition (CR1) obtained in the above Preparation Example to be a dry film thickness of 40 μm onto the base coating film surface, and heating and drying at 60° C. for 20 minutes for curing both coating film layer to obtain a coating test panel.

Examples 26 and 27, and Comparative Example 12

Example 25 was duplicated except that respective compositions shown in Table 10 were used to obtain respective coating test panels.

Example 28

The putty composition (PT2) obtained in the above Preparation Example was coated onto a mild steel sheet (90×150× 0.8 mm) to be a thickness of 5 mm by use of a spatula, followed by spray coating the primer composition (P4) obtained in Example 4 onto the above coating surface to be a dry film thickness of 50 to 100 μm, irradiating at an irradiation distance of 20 cm for 2 minutes by use of Square Light (trade name, marketed by Ushio Lighting Inc., metal halide lamp) for curing both coating film layer, slightly abrading the primer surface with a #600 water-resistant abrasive paper, spray coating the viscosity-controlled one pack colored base coating composition to be a dry film thickness of 15 μm, leaving to stand at room temperature (about 20° C.) for 5 minutes, spray coating the one pack clear composition (CR2) obtained in the above Preparation Example to be a dry film thickness of 40 μm onto the base coating film layer at an irradiation distance of 20 cm for 10 minutes for curing both coating film layers by use of Square Light (trade name as above) to obtain a coating test panel.

Example 29

Example 28 was duplicated except that respective coating compositions as shown in Table 10 were used, and that drying was carried out by irradiating at an irradiation distance of 50 cm for 10 minutes by use of a halogen lamp in curing the putty layer and primer layer and in curing the base layer and clear layer in place of Square Light (trade name as above).

Comparative Example 13

LUC putty cocuring agent (trade name, marketed by Kansai Paint Co., Ltd., organic peroxide based compound) was mixed with LUC Poly Putty (trade name, marketed by Kansai Paint Co., Ltd., unsaturated polyester resin based low temperature-curing two pack putty base material) in an amount of 2% relative to LUC Poly Putty just before use to obtain a putty composition, followed by coating the putty composition by use of a spatula so as to be a thickness of 5 mm, drying at 20° C. so that abrasion can be carried out to obtain a putty coating layer. Next, JUST Urethane Primer-Surface curing agent (trade name, marketed by Kansai Paint Co., Ltd.) was mixed in an amount of 20%, and Retan PG2K Thinner (trade name, marketed by Kansai Paint Co., Ltd.) was mixed in an amount of 20% relative to JUST Urethane Primer-Surfacer (trade name, marketed by Kansai Paint Co., Ltd., acrylic urethane resin based two pack primer-surfacer base material) with JUST Urethane Primer Surfacer (as above) respectively to obtain a primer composition. The primer composition was spray coated onto the putty coating layer so as to be a dry film thickness of 50 to 100 µm, followed by force-drying at 60° C. so that abrasion can be carried out, slightly abrading the resulting primer surface by use of a #600 water-resistant abrasive paper, spray coating the viscosity-controlled one pack colored base coating composition to be a dry film thickness of 15 µm, leaving to stand at room temperature (about 20° C.) for 5 minutes, spray coating a clear composition prepared by mixing PG multi clear HX(Q) (trade name as above) with PG multi clear HX standard curing agent (trade name as above) in an amount of 50% and PG hybrid thinner 20 (trade name as above) in an amount of 20% to be a dry film thickness of 40 µm onto the base coating layer, and drying at 60° C. for 20 minutes to obtain a coating test panel.

Evaluation Test

Respective coating test panels obtained as above were subjected to evaluation tests as follows. Results are shown in Table 10.

strongly separating the tape to examine a number of remaining squares for evaluating as follows.

○: numbers of remaining squares: 100 x: numbers of remaining squares: 99 or less (*3) Initial pencil hardness: Coating of the clear composition was followed by lamp-irradiation, force-drying or leaving to stand at 20° C. for 2 hours. A pencil hardness of the coating layer on the resulting coating test panel was measured in accordance with JIS K-5400 8.4.2 (1990). Evaluation was carried out by breaking.

(*4) Finish properties: Coating of the clear composition was followed by a lamp-irradiation, force-drying or leaving at 20° C. for 24 hours, and usually examining the coating surface of the resulting coating test panel as follows.

◎: Very good; ○: good; Δ: some distortion on the surface;

x: considerable distortion on the surface.

(*5) Water resistance: Respective coating test panels were dipped into a tap water, followed by examining conditions (development of blister) of the coating surface, and carrying out the adhesion properties test as above and a bending test. The bending test was carried out by bending at a central part of the coating test panel by an angle of 90°, and visually evaluating conditions of the bent part. Conditions of the coating surface: ○: good; Δ: blister partly developed; x: blister wholly developed.

Adhesion properties: ○: Nothing peeled; Δ; partly peeled; x: wholly peeled.

①: peeling between substrate and primer layer; ②: peeling between putty layer and primer layer; ③: primer layer and colored base layer.

Bending test: ○: good; Δ: slightly peeled; x: peeled. ①: separation between substrate and putty layer; ②: peeling between putty layer and primer layer; ③: peeling between primer layer and colored base layer.

TABLE 10

|  |  | Examples | | | | | Comparative Examples | |
| --- | --- | --- | --- | --- | --- | --- | --- | --- |
|  |  | 25 | 26 | 27 | 28 | 29 | 12 | 13 |
| Putty composition | | PT1 | PT1 | PT1 | PT2 | PT2 | PT1 | LUC poly putty |
| Primer composition | | P1 | P2 | P3 | P4 | P5 | P12 | JUST Urethane Primer-Surfacer |
| Colored base coating composition | | Retan PG hybrid full shade No. 835 | | | | | | |
| Clear composition | | CR1 | CR1 | CR1 | CR2 | CR3 | CR1 | PG multi clear HX(Q) |
| Performance test | total drying times (min.) | 24 | 24 | 24 | 12 | 20 | 24 | 65 |
|  | adhesion properties | ○ | ○ | ○ | ○ | ○ | ○ | ○ |
|  | initial pencil hardness | HB | HB | HB | H | H | HB | HB |
|  | finish properties | ○ | ○ | ○ | ○ | ○ | ○ | ○ |
| Water resistance | conditions of the coating surface | ○ | ○ | Δ | ○ | ○ | Δ | ○ |
|  | adhesion properties | ○ | ○ | ○ | Δ③ | Δ③ | Δ③ | ○ |
|  | bending test | ○ | ○ | Δ① | Δ① | Δ① | x② | Δ① |

(*1) Total drying time: a total time of heating and irradiation time in respective steps.

(*2) Adhesion properties: Coating of the clear composition was followed by lamp-irradiation or force-drying and leaving to stand at 20° C. for 24 hours, forming cuts reaching the substrate onto the resulting coating test panel by use of a knife to form 100 cut squares at an interval of 2 mm, applying a cellophane tape thereonto,

What is claimed is:

1. A photocurable primer composition containing (A) an acrylic resin having through an urethane linkage a polymerizable unsaturated group on its side chain and containing the polymerizable unsaturated group in an amount of 0.2 to 2.0 mol/kg in a solid content of the resin (A), (B) an urethane (meth)acrylate oligomer containing at least one polymerizable unsaturated group in one molecule and prepared by reacting a compound (e) containing at least two isocyanate groups in one molecule, a hydroxyl group-containing polymerizable unsaturated monomer (f) and a monohydric alcohol (g), (D) an extender pigment in an amount of 1 to 300 parts by weight per 100 parts by weight of a total resin solid content of the components (A), (B) and (C) in the primer composition, and (E) a photopolymerization initiator.

2. A photocurable primer composition as claimed in claim 1, wherein the resin (A) is prepared by reacting a hydroxyl group-containing acrylic resin (a) and a compound (b) containing isocyanate group and polymerizable unsaturated group in one molecule.

3. A photocurable primer composition as claimed in claim 1, wherein the resin (A) is prepared by reacting an isocyanate group-containing acrylic resin (c) and a compound (d) having hydrolxyl group and polymerizable unsaturated group in one molecule.

4. A photocurable primer composition as claimed in claim 1, wherein said composition further contains a polymerizable unsaturated compound (C) other than the resin (A) and the urethane (meth)acrylate oligomer (B).

5. A photocurable primer composition as claimed in claim 4, wherein a mixing amount of the components (A), (B) and (C) is such that the component (A) is in the range of 5 to 95% by weight, and the component (C) is in the range of 0 to 60% by weight based on a total solid content of the components (A), (B) and (C) respectively.

6. A photocurable primer composition as claimed in claim 1, wherein the extender pigment (D) is used in combination with a resin particle.

7. A photocurable primer composition as claimed in claim 1, wherein said composition has a thixotropy index value in the range of 5 or more.

8. A photocurable primer composition as claimed in claim 1, wherein the compound (e) is a cyclic trimer of hexamethylene diisocyanate.

9. A photocurable primer composition as claimed in claim 1, wherein said composition further contains a phosphate group-containing compound in an amount of 0.01 to 1.0 mmol/g as the phosphate group based on a total resin solid content of the components (A), (B) and (C) in the composition.

10. A coating method which comprises coating a photocurable putty composition onto a substrate to form an uncured coating film layer, irradiating light onto the uncured coating film layer to form a cured coating film layer, coating thereonto the photocurable primer composition as claimed in claim 1 to form an uncured coating film layer, and irradiating light onto the uncured coating film layer to form a cured coating film layer.

11. A coating method which comprises coating a photocurable putty composition onto a substrate to form an uncured coating film layer, coating thereonto the photocurable primer composition as claimed in claim 1 to form an uncured coating film layer, and irradiating light thereonto to cure both uncured coating film layers simultaneously.

12. A coating method as claimed in claim 11, which method is followed by coating a colored base coating composition and a clear composition onto the photocurable primer coating film layer, and heating or irradiation light to cure.

13. A coating method as claimed in claim 12, wherein both the colored base coating composition and the clear composition are a one-pack composition.

14. A coating method as claimed in claim 10, which method is followed by coating a colored base coating composition and a clear composition onto the photocurable primer coating film layer, and heating or irradiating light to cure.

15. A coating method as claimed in claim 14, wherein both the colored base coating composition and the clear composition are a one-pack composition.

16. A coating method as claimed in claim 15, wherein the clear composition is a one-pack clear composition containing (h) a resin containing at least one functional group selected from siloxy group and isocyanate group, (i) a compound containing at least one group selected from siloxy group and isocyanate group, and reactive with a functional group contained in the resin (h), and (j) a siloxy group-dissociating catalyst.

17. A coating method as claimed in claim 15, wherein the clear coating composition is a one-pack clear composition containing (h) a resin containing at least one functional group selected from siloxy group and isocyanate group, (i) a compound containing at least one group selected from siloxy group and isocyanage group, and reactive with a functional group contained in the resin (h), (j) a siloxy group-dissociating catalyst, (k) a polymerizable unsaturated group-containing compound, and (l) a photopolymerization initiator.

18. A coating method as claimed in claim 15, wherein the clear composition is a one-pack coating composition containing (m) a resin having a polymerizable unsaturated group and containing at least one functional group selected from siloxy group and isocyanate group, (n) a compound containing at least one function group selected from siloxy group and isocyanate group and reactive with a functional group reactive with a functional group contained in the resin (m), (j) a siloxy group-dissociating catalyst, and (l) a photopolymerization initiator.

* * * * *